United States Patent [19]
Mogi

[11] Patent Number: 5,587,004
[45] Date of Patent: Dec. 24, 1996

[54] DEFOAMING DEVICE AND METHOD FOR AERATION

[75] Inventor: Fumio Mogi, Kanagawa, Japan

[73] Assignee: Fuji Photo Film Co., Ltd., Kanagawa, Japan

[21] Appl. No.: 487,514

[22] Filed: Jun. 7, 1995

Related U.S. Application Data

[62] Division of Ser. No. 716,466, Jun. 17, 1991, abandoned.

[30] Foreign Application Priority Data

Jun. 22, 1990 [JP] Japan ..................... 2-165367

[51] Int. Cl.⁶ .................................. B01D 19/02
[52] U.S. Cl. ............................ 95/157; 95/185; 95/242; 95/260; 96/176; 96/202; 96/204
[58] Field of Search .................. 96/176, 179, 202, 96/204; 95/242, 260, 253, 155, 157, 185, 186; 261/76, DIG. 75; 210/718, 750

[56] References Cited

U.S. PATENT DOCUMENTS

| | | | |
|---|---|---|---|
| 2,017,867 | 10/1935 | Nantz | 261/DIG. 75 |
| 2,020,850 | 11/1935 | Myhren et al. | 261/DIG. 75 |
| 2,102,042 | 12/1937 | Spence | 261/DIG. 75 |
| 2,521,215 | 9/1950 | Haddeland et al. | 261/DIG. 75 |
| 3,420,450 | 1/1969 | Bergholm | 96/176 X |
| 3,723,343 | 3/1973 | Herzhoff et al. | 96/177 |
| 3,774,846 | 11/1973 | Schurig et al. | 261/DIG. 75 |
| 4,000,227 | 12/1976 | Garrett | 261/DIG. 75 |
| 4,099,925 | 7/1978 | Yanagioka et al. | 55/248 X |
| 4,534,774 | 8/1985 | Lecoffre et al. | 95/246 |
| 4,701,194 | 10/1987 | Weyers et al. | 261/76 X |
| 5,015,273 | 5/1991 | Hamilton et al. | 96/179 X |

FOREIGN PATENT DOCUMENTS

| | | |
|---|---|---|
| 2561130 | 9/1985 | France . |
| 817441 | 10/1951 | Germany . |
| 58-042048 | 3/1983 | Japan . |
| 233146 | 2/1990 | Japan . |
| 233145 | 2/1990 | Japan . |
| 0912206 | 3/1982 | U.S.S.R. . |
| 1156417 | 6/1969 | United Kingdom . |

*Primary Examiner*—Richard L. Chiesa
*Attorney, Agent, or Firm*—Sughrue, Mion, Zinn, Macpeak & Seas

[57] ABSTRACT

A defoaming device and method for aeration, for use in a processor equipped with an aeration apparatus for sending air into a processing solution. The defoaming device includes a pipe for guiding foam produced in the aeration apparatus to outside the aeration apparatus; and at least one of a throttle portion, which is disposed midway in the pipe and formed by reducing a cross-sectional area of the pipe, and an air-stream guiding device for guiding an air stream into a portion of the pipe in a downstream direction corresponding to the direction of the flow of the foam. The flow rate of foam in the pipe is accelerated by the throttle portion and/or the air-stream guiding device, thereby positively removing the foam produced in the aeration apparatus.

20 Claims, 3 Drawing Sheets

DEFOAMING DEVICE AND METHOD FOR AERATION

This application is a divisional application Ser. No. 07/716,466, filed on Jun. 17, 1991, and now abandoned.

BACKGROUND OF THE INVENTION

1. Field of the Invention

The present invention relates to a defoaming device and method for aeration, for removing foam produced in an aeration apparatus for sending air into a processing solution, in a case where a photosensitive material is subjected to development.

2. Description of the Related Art

In a developing machine for developing a photosensitive material, aeration is sometimes conducted, i.e., introduction of air into a bleaching solution so as to allow the bleaching solution to recover from its fatigued state. Aeration makes it possible for the bleaching solution to recover from its fatigued state by coming into contact with oxygen contained in the air.

When aeration is conducted, however, numerous bubbles are produced on the surface of the bleaching solution in a bleaching tank, and these bubbles, if brought into the developing tank, can cause contamination of the developing tank.

For this reason, it has been proposed to separate the bubbles or foam on the surface of a bleaching solution into air and bleaching solution respectively, by providing an air-separating column in the aeration apparatus (Japanese Patent Application Laid-Open Publication Nos. 2-33145 and 2-33146). This air-separating structure is so arranged that the foam produced by aeration is introduced into the separating column, and a baffle plate and activated carbon particles disposed in the separating column are made to effect defoaming action. However, deposits can adhere to the activated carbon particles, resulting in the blockage of an air-venting pipe, or the air which has failed to undergo defoaming by the baffle plate flows out of the separating column and causes the lowering of the solution level in the bleaching tank by exerting pressure on the liquid surface, or the foam can enter the developing tank, thereby causing contamination.

SUMMARY OF THE INVENTION

Accordingly, an object of the present invention is to provide a defoaming device for aeration capable of positively removing foam produced in an aeration apparatus, thereby overcoming the above-described drawbacks of the conventional art.

In accordance with one aspect of the invention, the defoaming device for aeration is used in a processor equipped with an aeration apparatus for sending air into a processing solution, and comprises a pipe for guiding foam produced in the aeration apparatus, and a throttle portion disposed midway in the pipe and formed by reducing a cross-sectional area of a portion of the pipe.

In accordance with this aspect of the invention, the foam produced in the aeration apparatus is guided through the pipe and led to the throttle portion. In the throttle portion, the foam is destroyed completely or reduced to fine bubbles as a compressive force and a shearing force act upon it. Accordingly, even if the liquid discharged via the throttle portion is returned to a processing tank such as a bleaching tank, the processing tank is prevented from becoming filled with foam.

In addition, it is possible to attain the defoaming action effectively if the flow rate of the foam passing through the throttle portion is set to be not less than twice the flow rate of the foam in a portion of the pipe located upstream of the throttle portion, or if the cross-sectional area of the throttle portion is set to be not more than one half of the cross-sectional area of a portion of the pipe located upstream of the throttle portion.

Furthermore, it is also possible to attain the defoaming action effectively if the linear velocity of the foam in the throttle portion is set to be 1 m/sec or more.

In accordance with a second aspect of the invention, the defoaming device for aeration comprises a pipe for guiding foam produced in an aeration device, and air-stream guiding means for guiding an air stream into a portion of the pipe in the downstream direction of the flow of the foam. Defoaming action takes place as a compressive force and a shearing force act on the foam by means of this air stream. A portion connecting the air-stream guiding means and the pipe can be arranged variously. For instance, an air-stream guiding pipe and a foam pipe both having the same diameter may be connected to each other in the form of a V-shaped configuration. Or, the diameter of the air-stream guiding pipe may be set to be smaller than that of the foam pipe, and a tip of the air-stream guiding pipe may be made to penetrate the wall of the foam pipe and inserted therein. Conversely, the diameter of the foam pipe may be set to be smaller than that of the air-stream pipe, and a tip of the foam pipe may be made to penetrate the wall of the air-stream pipe and inserted therein.

In accordance with a third aspect of the invention, the defoaming device for aeration is used in a processor equipped with an aeration apparatus for sending air into a processing solution, and comprises a pipe for guiding foam produced in the aeration apparatus, a throttle portion disposed midway in the pipe and formed by reducing the cross-sectional area of a portion of the pipe, and air-stream guiding means for guiding an air stream into the throttle portion in the downstream direction of the flow of the foam.

Accordingly, in accordance with this aspect of the invention, the foam is removed effectively by virtue of the defoaming effect due to both throttling and the air stream. In this case, the inside diameter of the air-stream guiding pipe and that of the throttle portion are made substantially the same. In other words, an arrangement may be provided such that three pipes having substantially the same diameter are joined. As for the angle at which these pipes can be joined, various modifications are conceivable.

The above and other objects, features and advantages of the invention will become more apparent from the following detailed description of the invention when read in conjunction with the accompanying drawings.

DESCRIPTION OF THE PREFERRED EMBODIMENT

Figure 2:
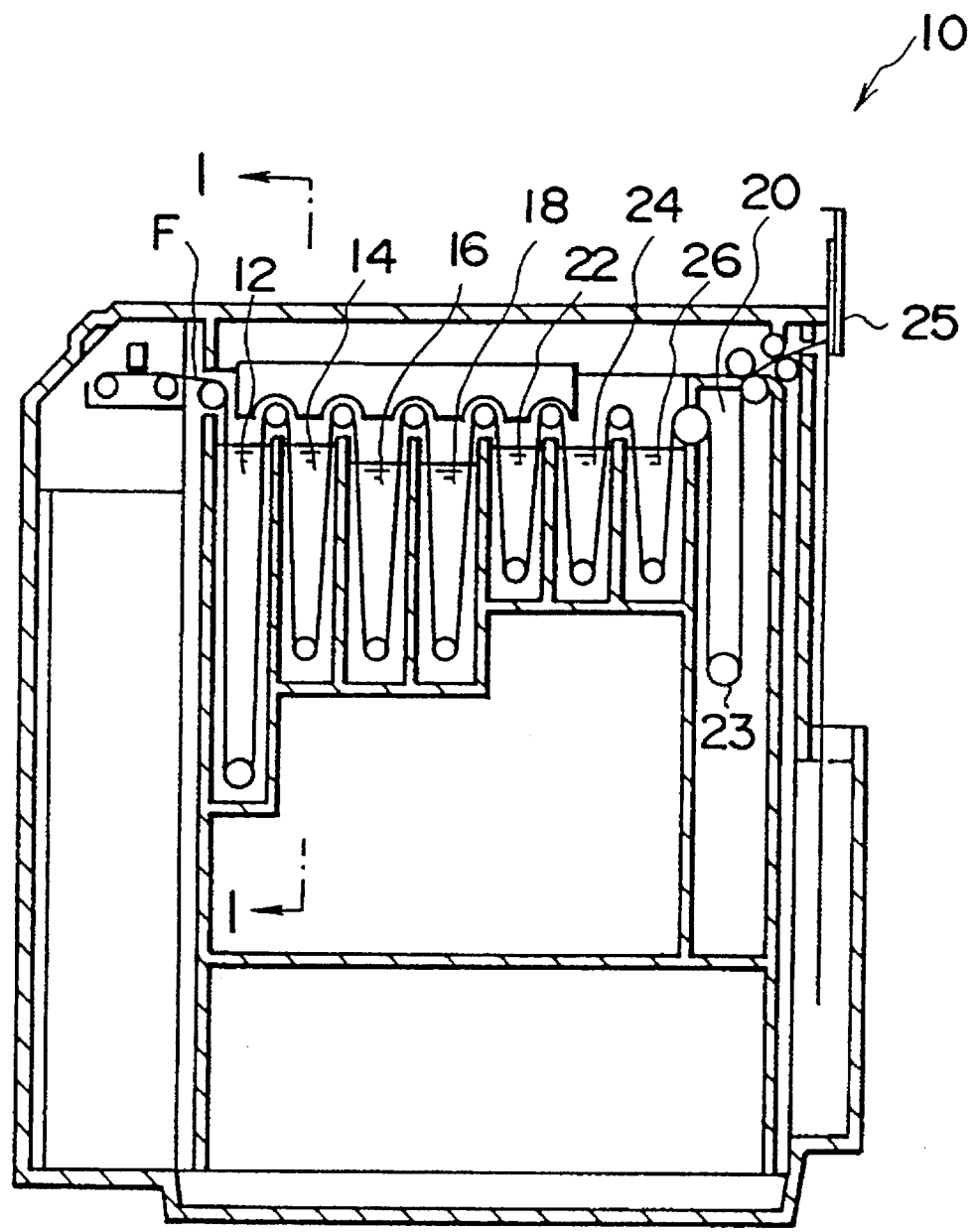
FIG. 2 is a cross-sectional view of an automatic processor to which the present invention is applied.

FIG. 2 illustrates an example of an automatic processor 10 as a photosensitive material processor in accordance with the present invention. This automatic processor 10 is a small-scale processor which is a so-called "miniature laboratory" in which negative film is transported automatically for processing.

This automatic processor 10 comprises a developing tank 12, a bleaching tank 14, a bleach-fixing tank 16, a fixing tank 18, rinsing tanks 22 and 24, and a stabilizing tank 26 which are arranged in series and in which various processing solutions including a developing solution, bleaching solution, bleach-fix solution, fixing solution, rinsing solution, and stabilizing solution are respectively contained in predetermined amounts. A photosensitive material F is consecutively transported to and immersed in these processing tanks by an unillustrated transport system adapted to convey the material F.

In addition, a drying section 20 is disposed adjacent to these processing tanks. After undergoing processing in the stabilizing tank 26 located at the downstream end of the processing system, the photosensitive material F is guided to the drying section 20 by means of the transport system, and passes around a roller 23 so as to undergo drying, and is accommodated in a film stocker 25.

Figure 1:
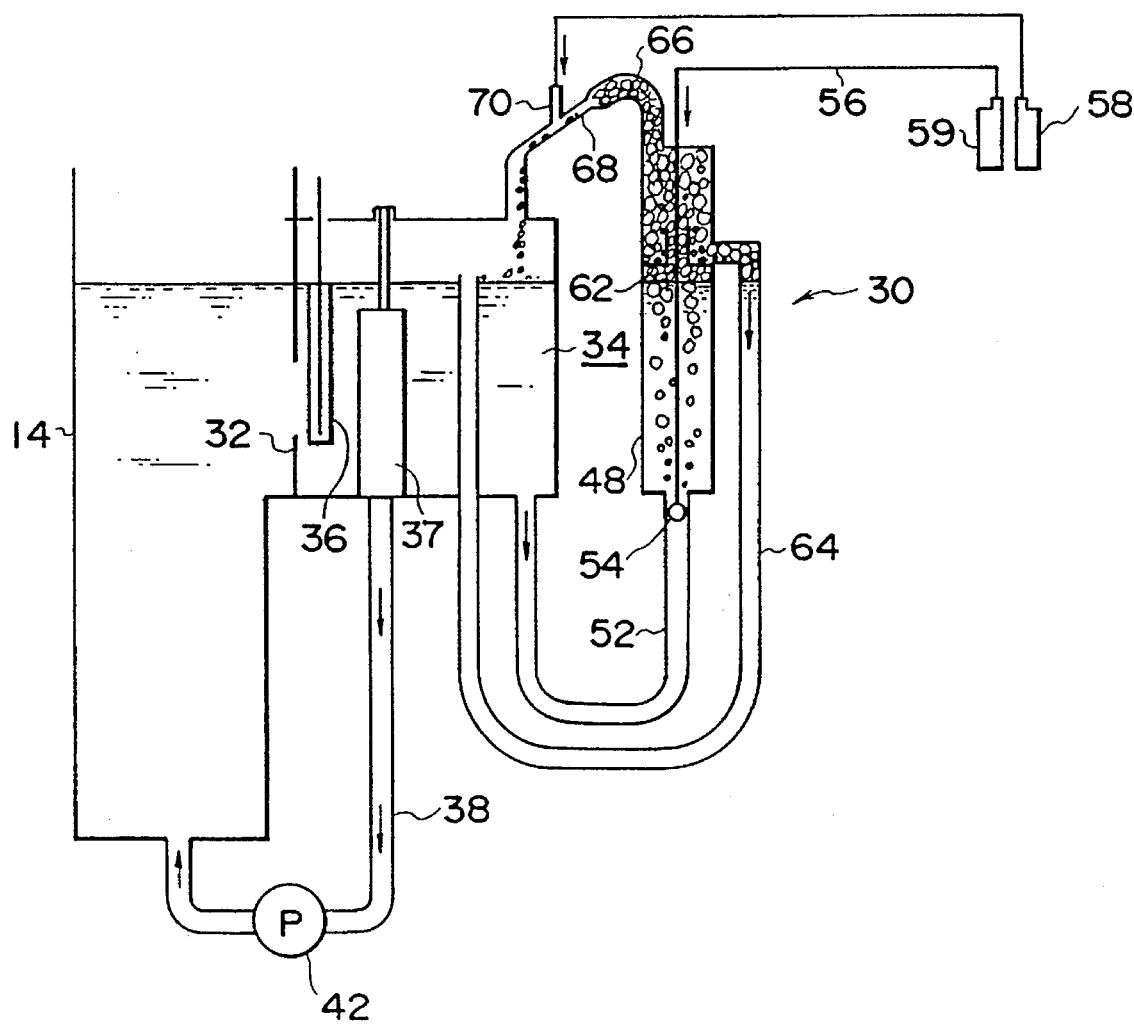
FIG. 1 is a cross-sectional view taken along the line I—I of FIG. 2 and illustrating a portion of an aeration apparatus for aerating a bleaching solution to which the present invention is applied.

As shown in FIG. 1, the bleaching tank 14 communicates with an auxiliary chamber 34 thereof via a partition chamber 32. This auxiliary chamber 34 is provided with a heater 36 for controlling the temperature of the bleaching solution.

A pipe 38 is disposed between the bottom of the auxiliary chamber 34 and the bottom of the bleaching tank 14 so as to allow them to communicate with each other via a filter 37, a circulating pump 42 being interposed midway in the pipe 38. This circulating pump 42 is adapted to suck the bleaching solution from the auxiliary chamber 34 via the filter 37 and transport the same into the bleaching tank 14, so as to control the temperature of the bleaching solution and stir the bleaching solution.

An aeration apparatus 30 is disposed adjacent to the auxiliary chamber 34. The aeration apparatus 30 has an aeration body 48 into which bleaching solution from the bleaching tank 14 is introduced from the bottom of the auxiliary chamber 34 of the bleaching tank 14 such that the solution level in the aeration body 48 is kept at the same level as the solution level in the bleaching tank 14. In other words, the bottom of the aeration body 48 communicates with the bottom of the auxiliary chamber 34 by means of a pipe 52 for guiding the bleaching solution. An air-blowing portion 54 is disposed inside the pipe 52 in the vicinity of the bottom of the aeration body 48. An air pump 59 communicates with the air-blowing portion 54 via a pipe 56. This pipe 56 vertically penetrates the axial center of the aeration body 48. As a result, the air-blowing portion 54 sends air into the bleaching solution in the aeration body 48 so as to allow aeration to take place.

A separating plate 62 is disposed slightly above the level of the bleaching solution in the aeration body 48. The separating plate 62 is provided with an opening for allowing the pipe 56 to penetrate therethrough. The bubbles which rise above the separating plate 62 are sent through a pipe 64 for allowing a side surface of the aeration body 48 and the auxiliary chamber 34 to communicate with each other, and the bubbles are then sent to the auxiliary chamber 34. The outlet of the pipe 64 at the auxiliary chamber 34 end is preferably disposed at a position higher than the solution level in the auxiliary chamber 34 so as to prevent fluctuations in the solution level of the solution in the auxiliary chamber 34.

One end of a pipe 66 communicates with an upper end portion of the aeration body 48, and the other end of the pipe 66 communicates with a ceiling portion of the auxiliary chamber 34. Accordingly, the bubbles produced in the aeration body 48 are allowed to enter the pipe 66. A throttle portion 68 whose cross-sectional area is reduced by about one-half is disposed midway in the pipe 66. In addition, air generated by an air pump 58 is sent to the throttle portion 68 via a pipe 70 which is located downstream of the entrance of the throttle portion 68. The pipe 70 and the throttle portion 68 are joined so as to have the form of a V-shaped configuration, thereby forming a Y-shaped configuration as a whole. The supply air through the pipe 70 serves to send the bubbles in the throttle portion 68 to the downstream side, i.e., to the auxiliary chamber 34 side.

It should be noted that at the time of stopping the operation of the aeration apparatus 30, it is preferred that the operation of the air pump 58 be continued for a while even after the air pump 59 is stopped. If this step is taken, the bubbles do not remain in the vicinity of the connecting portion between the pipe 70 and the throttle portion 68, thereby making it possible to prevent the bubbles in the pipe 70 from adhering to the interior of the pipe 70 upon drying.

A description will now be given of the operation of this embodiment.

The photosensitive material F is sent consecutively from the developing tank 12 to the bleaching tank 14, the bleach-fixing tank 16, etc., to undergo development, and the photosensitive material F is then dried in the drying section 20 and is received in the film stocker 25.

In the bleaching tank 14 shown in FIG. 1, the temperature control and circulation of the bleaching solution are effected by the circulating pump 42, and at the same time an aeration operation is conducted in the aeration body 48. That is, the air supplied through the air-blowing portion 54 inside the aeration body 48 is mixed with the bleaching solution, with the result that the bivalent Fe in the bleaching solution is reduced to the trivalent state, thereby regenerating the fatigued solution by means of oxygen in the air.

A large amount of foam is produced by this aeration, and defoaming action takes place in the separating column arranged in an upper portion of the aeration body 48. However, since this defoaming action is incomplete, the remaining foam enters the pipe 66. (The large amount of foam in the aeration body 48 is attributable to the active generation of foam which occurs when a surface active agent is eluted from the surface of the photosensitive material as the bleaching solution becomes fatigued.)

Since the foam which has been sent to the pipe 66 passes a sharply narrowed passage at the throttle portion 68, the flow rate is increased, so that a defoaming effect is attained. In addition, since air from the air pump 58 is supplied to the throttle portion 68, defoaming action takes place due to this air as well. Hence, the foam which has passed through the throttle portion 68 is completely removed, or enters the auxiliary chamber 34 in the form of very fine bubbles, while the air supplied through the air-blowing portion 54 is returned to the atmosphere. Accordingly, the foam which was generated in the aeration body 48 and which would otherwise lower the solution level in the bleaching tank 14, or reach the developing tank 12, is prevented from directly entering the auxiliary chamber 34.

If either of the two defoaming measures, i.e., the reduction of the cross-sectional area by means of the throttle portion 68, or the introduction of air, is adopted, the single measure can achieve the defoaming effect independently. Accordingly, the pipe 70 communicating with the pipe 66 does not need to be connected thereto at the throttle portion 68, and the defoaming effect can be achieved if the pipe 70 is connected to a portion of the pipe 66 having the same inside diameter as the portion thereof communicating with the aeration body 48. In addition, the inside diameter of the pipe 70 can be set to be substantially the same as the inside diameter of the throttle portion 68, thus improving the defoaming effect, by virtue of the fact that the diameters of all of the three legs of the Y-shaped connection formed by joining the pipe 70 are set to be the same.

In this embodiment, the amount of air supplied from the air pump 58 is set at 0.2–4.0 l/min, preferably 1.0–3.0 l/min. This amount of air supply is not restricted to this range, and may be set to be an arbitrary amount of supply. In addition, in this embodiment the inside diameter of the throttle portion 68 is set to be 3 mm, and the flow rate of foam is set to be 1.7 l/min. The flow rate M in this case is 28.3 cc/sec, and the cross-sectional area S of the throttle portion 68 becomes $(0.15 \times 0.15 \times \pi)\text{cm}^2 = 0.07065 \text{ cm}^2$. Accordingly, the linear velocity V becomes $$V = M/S = 28.3/0.07065 \approx 400 \text{ cm/sec} \qquad (1)$$

In other words, V is approximately 4 m/sec. In this case, air is supplied to enhance the linear velocity so as to improve the defoaming effect. In comparison, if the inside diameter is set at twice the size, i.e., 6 mm, and if air is not supplied, since the cross-sectional area is 0.2826 cm², the linear velocity becomes $28.3/0.2826 \approx 100$ cm/sec, one fourth as fast. If the inside diameter were made greater than this dimension, defoaming would become difficult.

Accordingly, it is necessary either to reduce the diameter of the throttle portion until the linear velocity becomes 1 m/sec or more, or to supply air separately so as to increase the linear velocity to 1 m/sec or more. In the above-described example, the linear velocity is set to be more than 1 m/sec (i.e., 4 m/sec), and air is supplied as well. Hence, this arrangement is more effective.

Figure 3A:
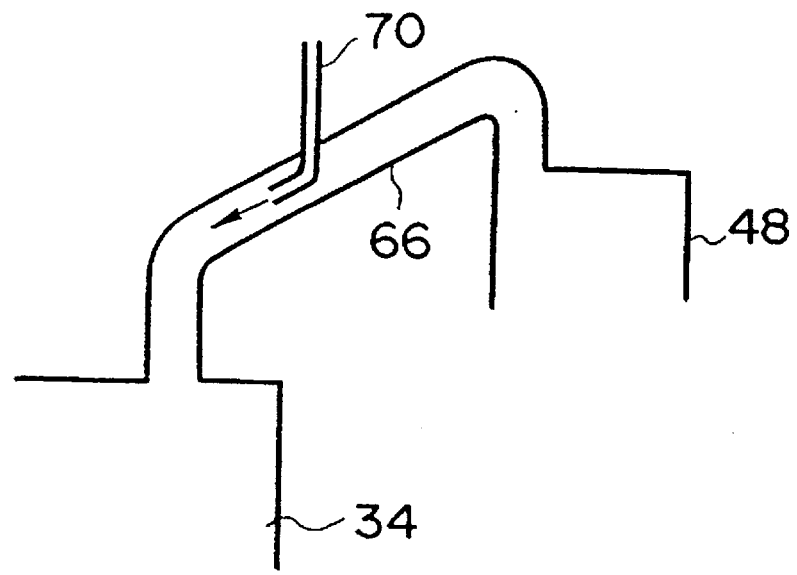
FIGS. 3A and 3B are cross-sectional views illustrating modifications of a connecting portion where foam and an air stream converge.
Figure 3B:
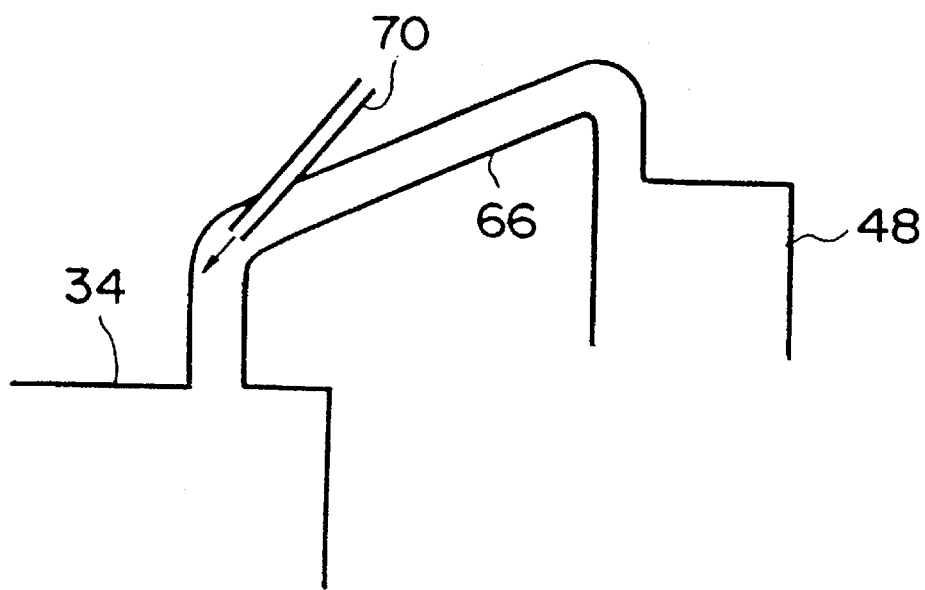

FIGS. 3A and 3B show modifications of the connecting portion where the pipes 66 and 70 are joined. In FIG. 3A, the pipe 70 having a smaller diameter than that of the pipe 66 penetrates the wall of the pipe 66 and extends into the pipe 66 in such a manner that the tip of the pipe 70 is disposed coaxially with the pipe 66.

In FIG. 3B, the pipe 70 similarly extends into the pipe 66, but the tip thereof is disposed in the vicinity of a bent portion of the pipe 66.

Furthermore, the respective diameters of the pipes 60 and 70 for the foam and the air stream may be switched. In other words, an arrangement may be provided such that a small-diameter pipe for the foam extends into a large-diameter pipe for the air stream.

What is claimed is:

1. A defoaming device for aeration, for use in a processor equipped with an aeration apparatus for sending air into a processing solution, comprising:

a pipe for guiding foam produced in said aeration apparatus to outside said aeration apparatus;

a throttle portion disposed midway in said pipe and formed by reducing the cross-sectional area of said pipe so as to accelerate the flow rate of the foam in said pipe, portions of said pipe at an upstream side of said throttle portion being isolated from ambient;

air-stream guiding means co-acting with said throttle portion for guiding an air stream into a portion of said pipe in a downstream direction corresponding to the direction of the flow of the foam so as to accelerate the flow rate of the foam in said pipe up to a predetermined rate, said air-stream guiding means being disposed at the downstream side of said throttle portion, said pipe having no throttle portions downstream of said air-stream guiding means.

2. A defoaming device for aeration according to claim 1, further comprising:

air-supplying means for supplying air for producing an air stream.

3. A defoaming device for aeration according to claim 2, wherein at least one of the setting of the cross-sectional area of said throttle portion in such a manner that a linear velocity of the foam in said throttle portion becomes 1 m/sec or more, and, the supply of air by said air-supplying means, is conducted.

4. A defoaming device for aeration according to claim 3, wherein the inside diameter of said throttle portion is set to be 6 mm or less.

5. A defoaming device for aeration according to claim 3, wherein the amount of air supplied by said air-supplying means is between 0.2 l/min and 4.0 l/min.

6. A defoaming device for aeration according to claim 1, wherein said throttle portion is formed such that the flow rate of the foam in said throttle portion is set to be not less than twice the flow rate of the foam in a portion of said pipe located upstream of said throttle portion.

7. A defoaming device for aeration according to claim 1, wherein the cross-sectional area of said throttle portion is set to be not more than one half of the cross-sectional area of a portion of said pipe located upstream of said throttle portion.

8. A defoaming device for aeration according to claim 1, wherein said air-stream guiding means is connected to said pipe at a connecting portion for introducing the air stream into a foam stream, said connecting portion being formed into a substantially Y-shaped configuration.

9. A defoaming device for aeration according to claim 8, wherein a portion of said air-stream guiding means where an air-stream outlet thereof is located is formed into a tubular configuration and is connected to said pipe so as to form said connecting portion, and the inside diameter of a portion of said pipe located upstream of said connecting portion, the inside diameter of a portion of said pipe located downstream of said connecting portion, and the inside diameter of the portion of said air-stream guiding means where said air-stream outlet thereof is located are substantially the same.

10. A defoaming device for aeration according to claim 1, wherein said pipe communicates with a processing solution tank in such a manner as to guide the foam into said processing solution tank.

11. A defoaming method for use in a processor equipped with an aeration apparatus for sending air into a processing solution, said method comprising:

guiding foam produced in said aeration apparatus through a pipe to an outside apparatus;

increasing a flow rate of the foam in said pipe by providing a throttle portion midway in said pipe and by providing means for guiding an air stream into a portion of said pipe downstream of said throttle portion of said pipe in a direction corresponding to a direction of flow for the foam, said pipe having no throttle portions downstream of said air stream guiding means and portions of said pipe at an upstream side of said throttle portion being isolated from ambient.

12. A defoaming method for aeration according to claim 11, further comprising:

supplying air to produce the air stream.

13. A defoaming method according to claim 12, wherein at least one of: (i) setting the cross-sectional area of said throttle portion in such a manner that a linear velocity of the foam in said throttle portion becomes at least 1 m/sec, and (ii) supplying air by said air-supplying means is conducted.

14. A defoaming method according to claim 13, wherein an inside diameter of said throttle portion is set to be at most 6 mm.

15. A defoaming method according to claim 13, wherein a volumetric flow rate of the air guided into said pipe is between 0.2 l/min and 4.0 l/min.

16. A defoaming method for aeration according to claim 11, wherein said throttle portion is formed such that said predetermined flow rate of the foam in said throttle portion is set to be not less than twice the flow rate of the foam in a portion of said pipe upstream of said throttle portion.

17. A defoaming method according to claim 11, wherein the cross-sectional area of said throttle portion is set to be not more than one half a cross-sectional area of a portion of said pipe located upstream of said throttle portion.

18. A defoaming method according to claim 11, wherein said air stream is guided into said pipe at a connecting portion for introducing the air stream into a foam stream, said connecting portion being formed into a substantially Y-shaped configuration.

19. A defoaming method according to claim 18, wherein:

an outlet is formed into a tubular configuration and is connected to said pipe so as to form said connecting portion; and an inside diameter of a portion of said pipe located upstream of said connecting portion, an inside diameter of a portion of said pipe located downstream of said connecting portion, and an inside diameter of the portion of said air-stream outlet are substantially the same.

20. A defoaming method according to claim 11, wherein said outside apparatus includes a processing solution tank, and said pipe communicates with said processing solution tank in such a manner as to guide the foam into said processing solution tank.

* * * * *